United States Patent
Choi

(10) Patent No.: US 11,469,654 B2
(45) Date of Patent: Oct. 11, 2022

(54) APPARATUS FOR GUIDING INSERTION OF SEGMENT TYPE STATOR COIL

(71) Applicants: HYUNDAI MOTOR COMPANY, Seoul (KR); KIA MOTORS CORPORATION, Seoul (KR)

(72) Inventor: Seung Min Choi, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/211,782

(22) Filed: Mar. 24, 2021

(65) Prior Publication Data

US 2022/0077753 A1 Mar. 10, 2022

(30) Foreign Application Priority Data

Sep. 4, 2020 (KR) .................. 10-2020-0113274

(51) Int. Cl.
*H02K 15/06* (2006.01)
*H02K 15/085* (2006.01)
*H02K 3/12* (2006.01)

(52) U.S. Cl.
CPC ............. *H02K 15/064* (2013.01); *H02K 3/12* (2013.01); *H02K 15/085* (2013.01)

(58) Field of Classification Search
CPC ...... H02K 15/064; H02K 15/085; H02K 3/12; Y10T 29/53143
See application file for complete search history.

(56) References Cited

U.S. PATENT DOCUMENTS

| | | | |
|---|---|---|---|
| 2014/0013592 A1* | 1/2014 | Yoshida | H02K 15/024 29/732 |
| 2015/0074985 A1* | 3/2015 | Ohno | H02K 15/064 29/745 |
| 2015/0180319 A1* | 6/2015 | Kimura | H02K 15/0087 29/596 |

FOREIGN PATENT DOCUMENTS

JP 2004173357 A 6/2004

* cited by examiner

*Primary Examiner* — Livius R. Cazan
(74) *Attorney, Agent, or Firm* — McDonnell Boehnen Hulbert & Berghoff LLP

(57) ABSTRACT

An apparatus is provided for guiding insertion of segment type stator coils into slots of a stator core where the stator coils are in multiple layers in the radial direction, and the apparatus includes a support jig forming a penetration hole at a central portion and fixedly installed on an upper surface of a frame, a plurality of coil guide members installed in the support jig to move radially back and forth and forming guide passages connected to the slots in an up and down direction, and a driving unit installed to be connected to the coil guide members and configured to apply a back and forth operational force to the coil guide members.

9 Claims, 11 Drawing Sheets

APPARATUS FOR GUIDING INSERTION OF SEGMENT TYPE STATOR COIL

CROSS-REFERENCE TO RELATED APPLICATION

This application claims priority to and the benefit of Korean Patent Application No. 10-2020-0113274 filed in the Korean Intellectual Property Office on Sep. 4, 2020, the entire contents of which are incorporated herein by reference.

BACKGROUND

(a) Field

This disclosure relates to the manufacture of a drive motor having a stator of a hairpin winding type.

(b) Description of the Related Art

In general, hybrid vehicles or electric vehicles called environment-friendly vehicles employ a technology that generates driving torque by a drive motor. As a way to reduce the weight and volume of vehicle and component parts, automakers and environment-friendly component part manufacturers apply a drive motor with a stator wound with a hairpin type stator coil. These hairpin winding type stators are manufactured through the process of winding hairpin type stator coils to the stator core and the process of welding the wound stator coils to the stator core. For example, in the winding process of the stator coils, stator coils are inserted into a separate dummy core by a multi-axis robot, and the stator coils aligned through the dummy core are gripped by a separate gripper and inserted into the slots of the stator core. As such, according to the conventional art, as a dummy core for aligning stator coils and a gripper for inserting stator coils arranged in the dummy core into the stator core are separately required, it may cause an increase in initial investment cost and an increase in cycle time. The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide an apparatus for guiding insertion of a segment type stator coil having an advantage of removing an additional apparatus and process for aligning stator coils, and being capable of directly inserting stator coils into slots of the stator core by a multi-axis robot. An exemplary apparatus is provided for guiding insertion of segment type stator coils into slots of a stator core wherein the stator coils are in multiple layers in a radial direction. The apparatus includes a support jig forming a penetration hole at a central portion and fixedly installed on an upper surface of a frame, a plurality of coil guide members installed in the support jig to move radially back and forth and forming guide passages connected to the slots in an up and down direction, and a driving unit installed to be connected to the coil guide members and configured to apply a back and forth operational force to the coil guide members. An exemplary apparatus may further include a core supply unit installed to be movable in the up and down direction, and configured to load the stator core from below the upper surface of the frame and to position the stator core to an interior side of the penetration hole of the support jig through the upper surface of the frame. The core supply unit may include a core loading portion provided in a base portion below an upper surface of the frame to be movable in the up and down direction, and an operation cylinder installed in the base portion and connected to the core loading portion. The coil guide members may guide the stator coils transferred by a robot to the slots in the up and down direction through the guide passage. An exemplary apparatus is provided for guiding insertion of segment type stator coils into slots of a stator core where the stator coils being in multiple layers in a radial direction. The apparatus may include a fixed rail plate provided in a disk shape forming a penetration hole at a central portion, fixedly installed on an upper surface of a frame, and forming a plurality of rail grooves radially on an upper surface of the fixed rail plate, a plurality of coil guide members having cam follower protrusions on upper surfaces, installed to move back and forth in the rail grooves of the fixed rail plate, and forming guide passages connected to the slots in an up and down direction, a movable rail plate rotatably installed and having a lower surface contacting the upper surface of the fixed rail plate, the lower surface of the movable rail plate being formed with cam follower rails in contact with the cam follower protrusions of the coil guide members, and a servo-motor installed in the frame and having a drive gear gear-meshed with the movable rail plate. An exemplary apparatus may further include a core supply unit installed to be movable in the up and down direction and configured to load the stator core from below the upper surface of the frame and to position the stator core to an interior side of the penetration hole of the fixed rail plate through the upper surface of the frame. The rail grooves may be formed on the upper surface of the fixed rail plate, linearly toward a center of the penetration hole of the fixed rail plate. The movable rail plate may be formed in a disk shape corresponding to the fixed rail plate, and the cam follower rails may be formed on the lower surface of the movable rail plate in an oblique direction. Gear teeth gear-meshed with the drive gear may be formed on an edge of the movable rail plate. Each of the coil guide members may include a guide arm coupled to the rail groove of the fixed rail plate, slidably in the back and forth direction, and a guide finger integrally formed at an end the guide arm toward a center of the penetration hole of the fixed rail plate. The guide fingers of the coil guide members may form the guide passages connected to the slots in the up and down direction between neighboring guide fingers. The guide finger may be provided in a form in which a cross-section width gradually increases from a top to a bottom, and forms a tapered surface at each of the lateral sides. The guide passages connected to the slots in the up and down direction may be formed between tapered surfaces of neighboring guide fingers. The guide finger may be formed longer than the slot. According to an exemplary embodiment, an additional apparatus and process for aligning stator coils may be removed, and an additional gripping apparatus and process for gripping the stator coils aligned in the aligning apparatus and inserting the gripped stator coils into the slots of the stator core may be removed. Other effects that may be obtained or are predicted by an exemplary embodiment will be explicitly or implicitly described in a detailed description of the present disclosure. That is, various effects that are predicted according to exemplary embodiments will be described in the following detailed description.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
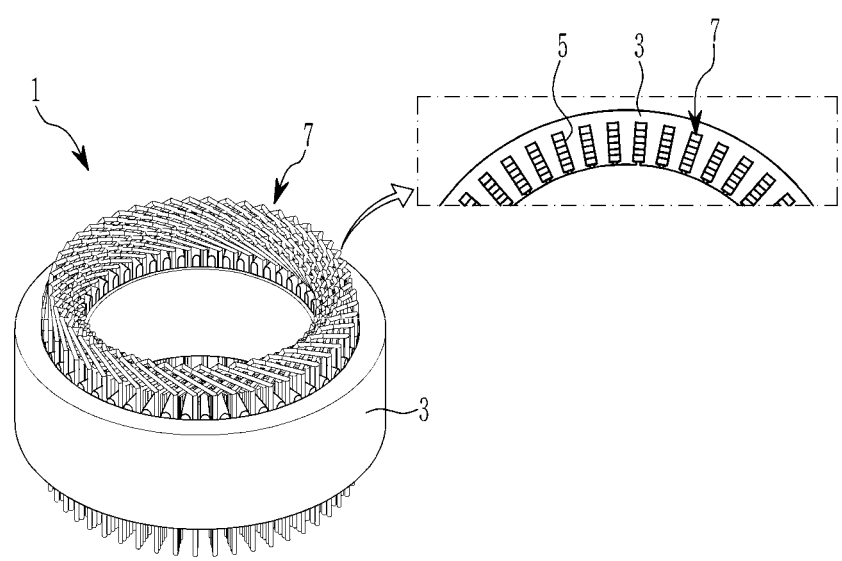
FIG. 1 illustrates an example of a hairpin winding type stator applied to an exemplary embodiment.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. In order to clarify the present disclosure, parts that are not related to the description will be omitted, and the same elements or equivalents are referred to with the same reference numerals throughout the specification. Also, the size and thickness of each element are arbitrarily shown in the drawings, but the present disclosure is not necessarily limited thereto, and in the drawings, the thickness of layers, films, panels, regions, etc., are exaggerated for clarity. In addition, in the following description, dividing names of components into first, second, and the like is to divide the names because the names of the components are the same as each other and an order thereof is not particularly limited.

Figure 2:
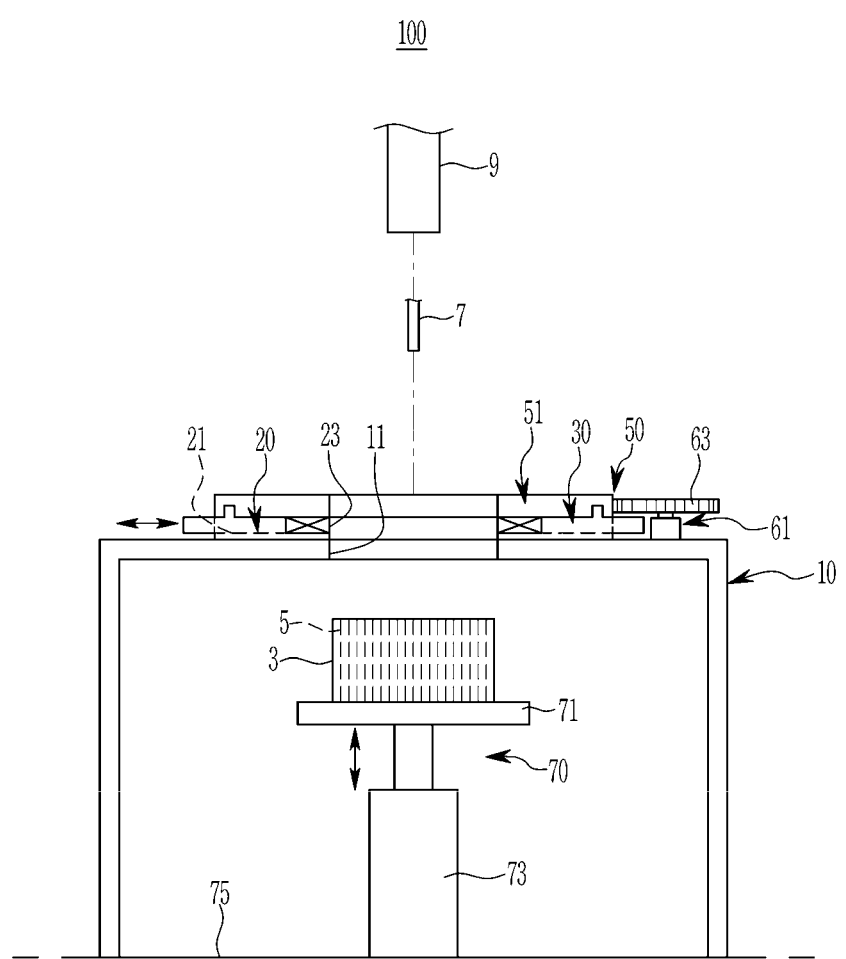
FIG. 2 is a block diagram schematically illustrating an apparatus for guiding insertion of a segment type stator coil according to an exemplary embodiment.
Figure 3:
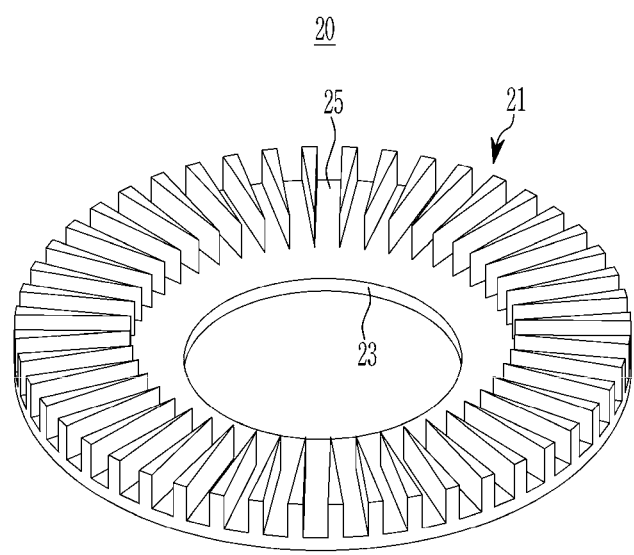
FIG. 3 illustrates a fixed rail plate applied to an apparatus for guiding insertion of a segment type stator coil according to an exemplary embodiment.
Figure 4:
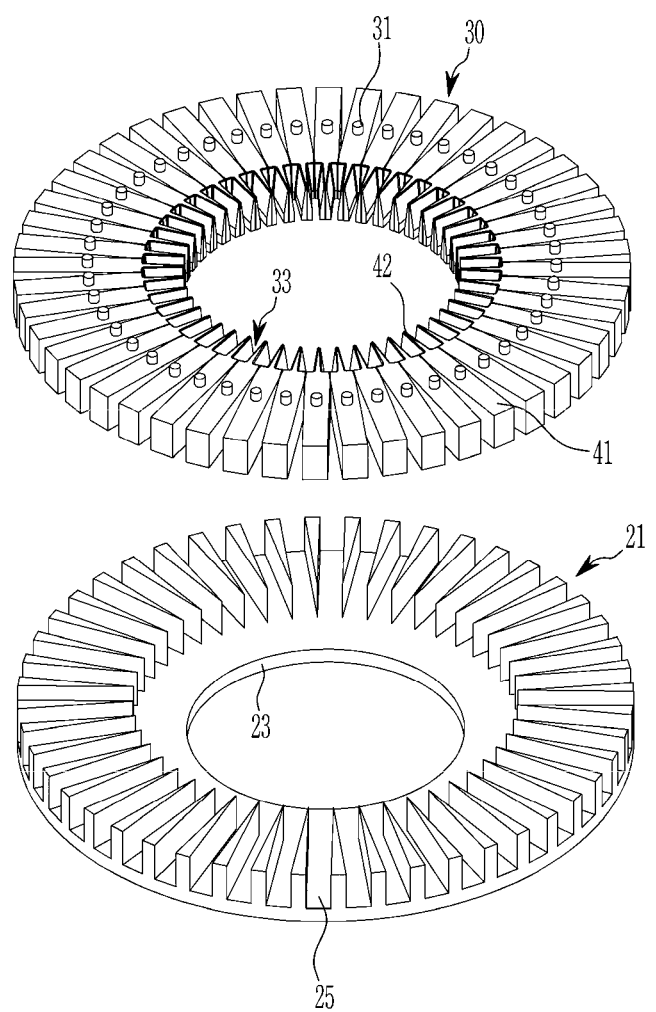
FIG. 4 illustrates a coupling structure of a fixed rail plate and a coil guide members applied to an apparatus for guiding insertion of a segment type stator coil according to an exemplary embodiment.
Figure 5:
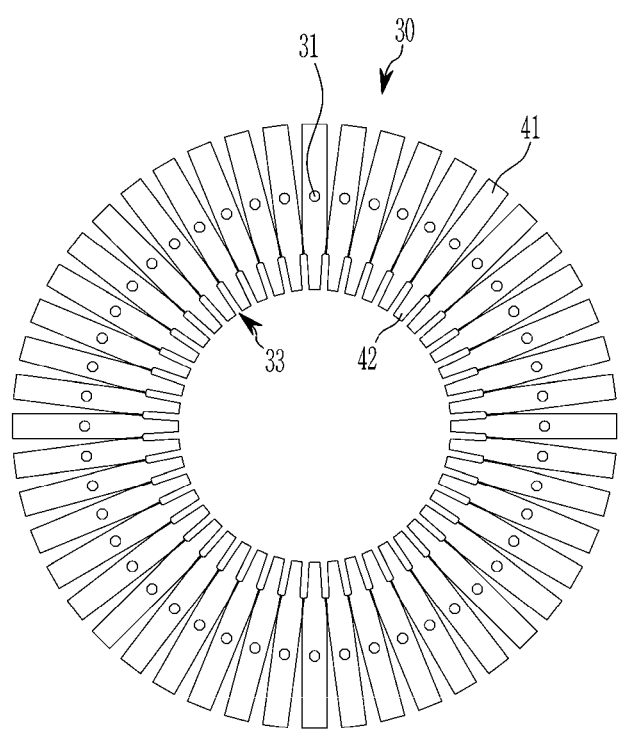
FIG. 5 is a plan schematic diagram illustrating coil guide members applied to an apparatus for guiding insertion of a segment type stator coil according to an exemplary embodiment.
Figure 6:
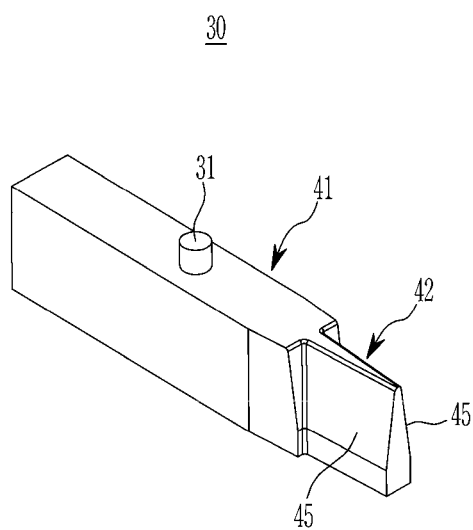
FIG. 6 is a perspective view illustrating coil guide members applied to an apparatus for guiding insertion of a segment type stator coil according to an exemplary embodiment.
Figure 7:
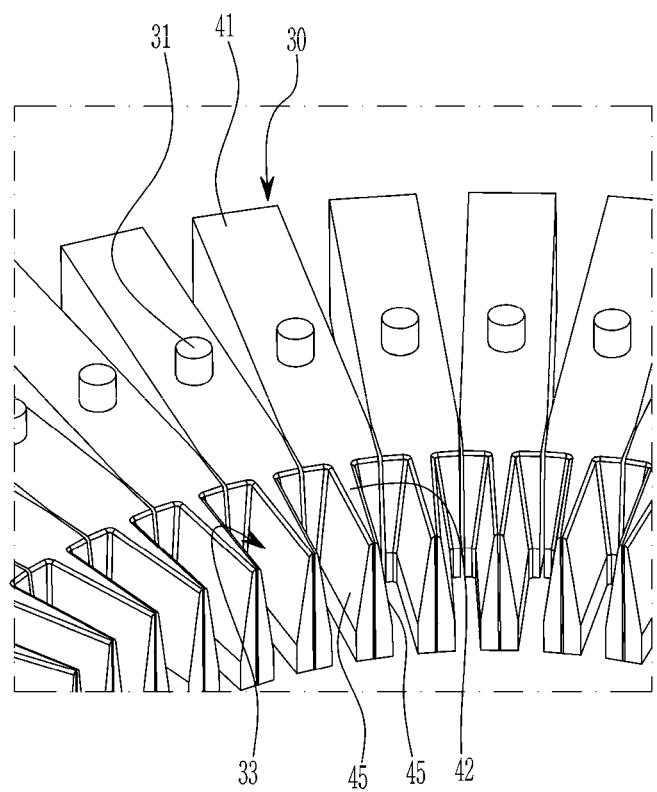
FIG. 7 and FIG. 8 respectively illustrate a guide finger portion of coil guide members applied to an apparatus for guiding insertion of a segment type stator coil according to an exemplary embodiment.
Figure 8:
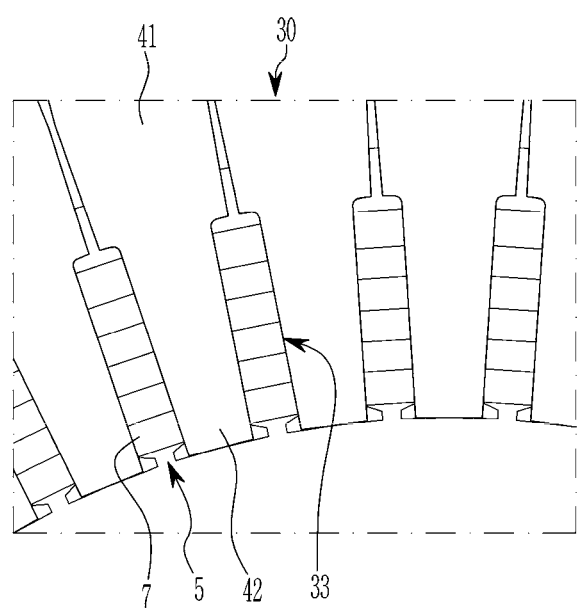
Figure 9:
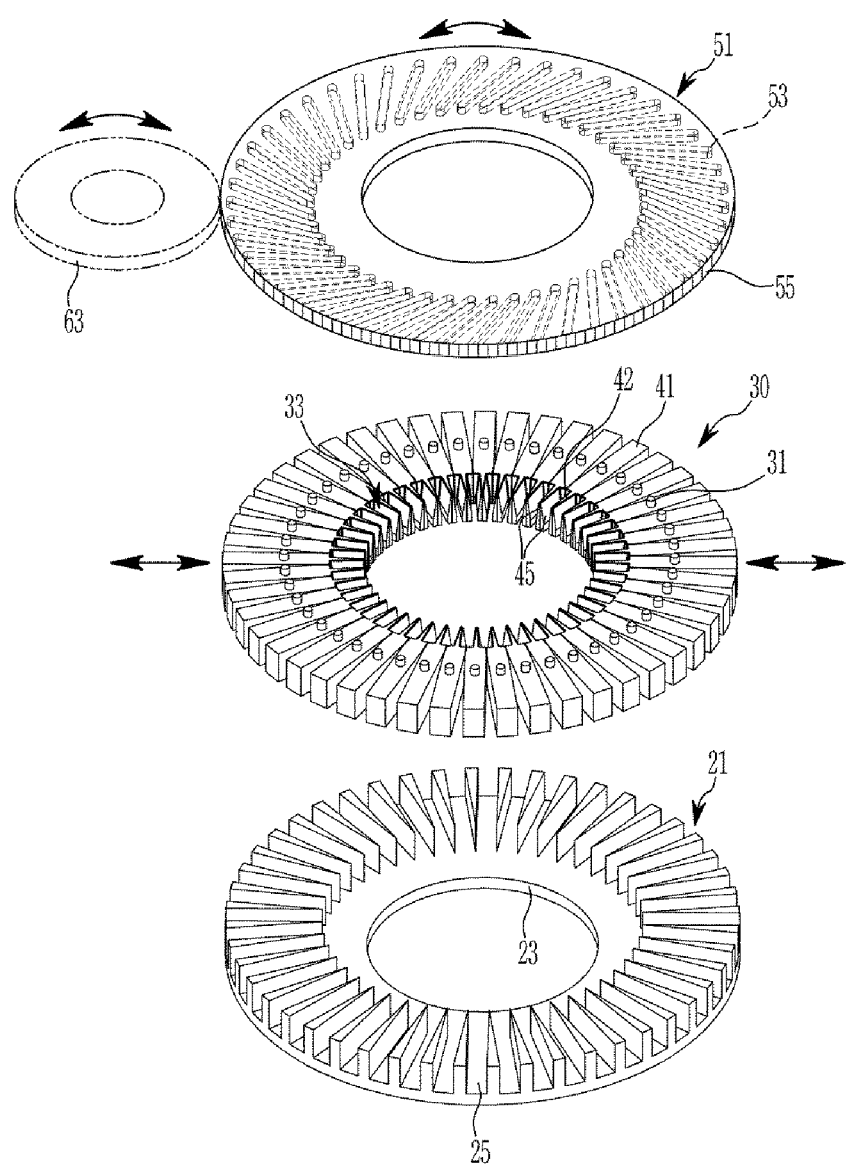
FIG. 9 illustrates a movable rail plate portion applied to an apparatus for guiding insertion of a segment type stator coil according to an exemplary embodiment.
Figure 10:
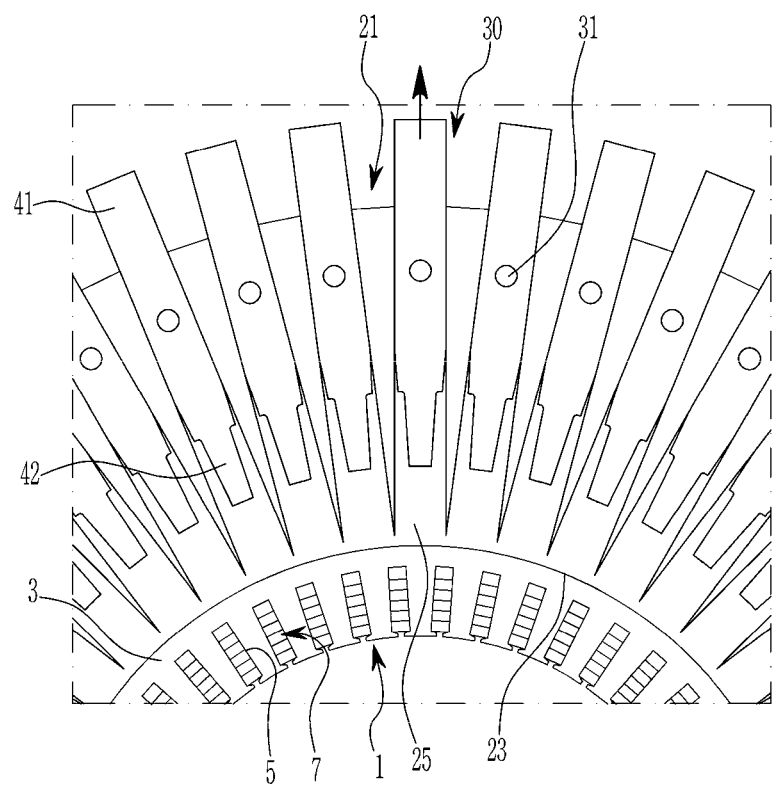
FIG. 10 and FIG. 11 respectively illustrate an operation of an apparatus for guiding insertion of a segment type stator coil according to an exemplary embodiment.
Figure 11:
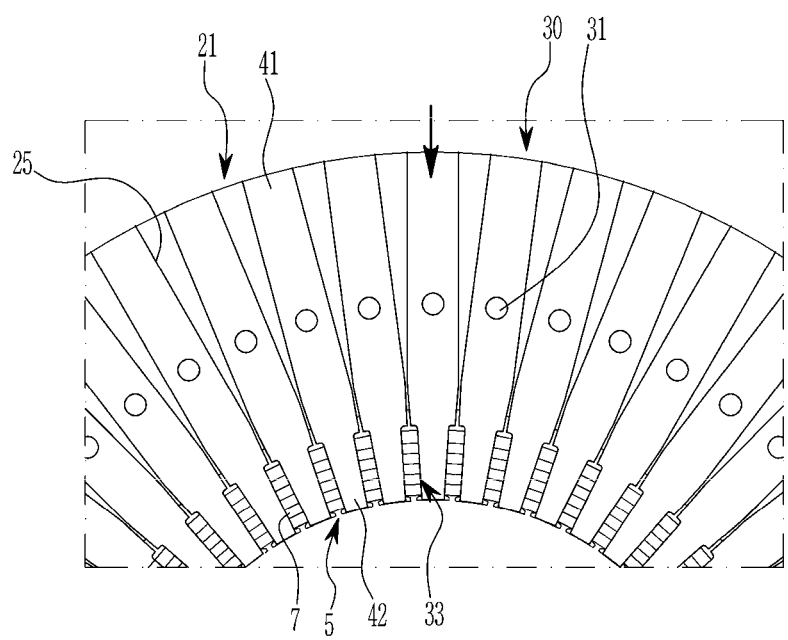

In addition, unless explicitly described to the contrary, the word "comprise" and variations such as "comprises" or "comprising", will be understood to imply the inclusion of stated elements but not the exclusion of any other elements. Furthermore, each of the terms, such as " . . . unit", " . . . means", " . . . part", and " . . . member" described in the specification, mean a unit of a comprehensive element that performs at least one function or operation. FIG. 1 illustrates an example of a hairpin winding type stator applied to an exemplary embodiment. Referring to FIG. 1, a hairpin winding type stator 1 applied to an exemplary embodiment may be applied to a drive motor for a hybrid vehicle and/or electric vehicle as an environment-friendly vehicle that obtains driving torque from electrical energy. The drive motor includes the stator 1 applied to an exemplary embodiment and a rotor (not shown) disposed with a predetermined air gap from the stator 1. The stator 1 includes a stator core 3 in which a number of electrical steel sheets are stacked. The stator core 3 has an exterior circumference surface and an interior circumference surface, and forms a plurality of slots 5 (e.g., 48 slots) that are formed in a radial direction and arranged circumferentially. Hairpin type stator coils 7 (which are commonly referred to as a conductor, a segment coil, or a flat coil, in the industry) are wound in the slots 5. For example, the stator coils 7 are provided as a V-shaped hairpin type having a pair of legs, and may be provided as a flat coil having a rectangular cross-section. Furthermore, the stator coils 7 may be provided as a U-shaped or I-shaped hairpin type having a rectangular cross-section. Such hairpin type stator coils 7 are inserted into the slots 5 of the stator core 3, and legs of the stator coils 7 protrude through lower ends of the slots 5. The legs protruding through the lower ends of the slots 5 may be welded together to form an electrical circuit. In the above disclosure, an exemplary embodiment has been described to be applied to a hairpin winding type stator in a drive motor employed in a envi-ronment-friendly vehicle, however, the scope of the present disclosure is not limited thereto. It may be understood that the spirit of the present disclosure may be applied to a drive motor of various types and uses. Meanwhile, an apparatus 100 for guiding insertion of a segment type stator coil according to an exemplary embodiment may be applied to the process of inserting the stator coils 7 of the hairpin type into the slots 5 of the stator core 3, during a process of assembling such a drive motor. Regarding the stator coils 7 arranged in the slots 5 of the stator core 3, a circumferential layer of the stator coils 7 positioned outermost of the slot 5 is called a first layer, and layers positioned gradually inward in the radial direction from the first layer are called a second, a third, a fourth, a fifth, a sixth, . . . , layers, sequentially. Hereinafter, with reference to a mounting position of the elements (with reference to the drawings), a portion facing upward is called an upper portion, an upper end, an upper surface, and an upper end portion, a portion facing downward is called a lower part, a lower end, a lower surface, and a lower end portion. In addition, hereinafter, an "end" (e.g., one end, another end, and the like) may be defined as any one end or may be defined as a portion (e.g., one end portion, another end portion, and the like) including that end. According to an apparatus 100 for guiding insertion of a segment type stator coil according to an exemplary embodiment, an additional apparatus and process for aligning the stator coils 7 may be removed, and the stator coils 7 may be directly inserted into the slots 5 of the stator core 3 by a multi-axis robot 9. FIG. 2 is a block diagram schematically illustrating an apparatus for guiding insertion of a segment type stator coil according to an exemplary embodiment. Referring to FIG. 1 and FIG. 2, an apparatus 100 for guiding insertion of a segment type stator coil according to an exemplary embodiment includes a frame 10, a support jig 20, coil guide members 30, a driving unit 50, and a core supply unit 70. The frame 10 is for installing various constituent elements, which will be described further below, and is installed at a bottom of the process work area. The frame 10 may be formed as a single frame or two or more sub-frames connected to each other. The frame 10 may include various accessory elements such as brackets, bars, rods, plates, blocks, ribs, collars, and the like to support various constituent elements. However, since such accessory elements are for installing respective constituent elements to be described further below to the frame 10, such accessory elements may be collectively referred to as the frame 10. In an exemplary embodiment, the support jig 20 is to support the coil guide members 30 that will be described further later, and includes a fixed rail plate 21 fixedly installed on the an upper surface of the frame 10. FIG. 3 illustrates a fixed rail plate applied to an apparatus for guiding insertion of a segment type stator coil according to an exemplary embodiment. Referring to FIG. 2 and FIG. 3, the fixed rail plate 21 is formed in a disk shape defining a penetration hole 23 in a center. The fixed rail plate 21 is fixed to the upper surface of the frame 10, and the upper surface of the frame 10 defines a connection hole 11 that is connectable to the penetration hole 23 of the fixed rail plate 21. A plurality of rail grooves 25 are radially formed on an upper surface of the fixed rail plate 21. The rail grooves 25 are provided in a number corresponding to the number of slots 5 of the stator core 3 (refer to FIG. 1). The rail grooves 25 are formed on the upper surface of the fixed rail plate 21, linearly toward a center of the penetration hole 23 of the fixed rail plate 21. The rail grooves 25 connect the exterior circumference surface of the fixed rail plate 21 to the interior circumference surface of the fixed rail plate 21. FIG. 4 illustrates a coupling structure of a fixed rail plate and a coil guide members applied to an apparatus for guiding insertion of a segment type stator coil according to an exemplary embodiment, and FIG. 5 is a plan schematic diagram illustrating coil guide members applied to an apparatus for guiding insertion of a segment type stator coil, according to an exemplary embodiment. Referring to FIG. 4 and FIG. 5, the coil guide members 30 according to an exemplary embodiment is to guide the stator coils 7 into the slots 5 during the process of inserting the stator coils 7 into the slots 5 by the multi-axis robot 9 (refer to FIG. 2). Here, the multi-axis robot 9 is installed at the bottom of the work area. The multi-axis robot 9 may be provided according to a known scheme that is capable of gripping the stator coil 7 and transferring the stator coil 7 along a predetermined path. The coil guide members 30 are installed to move back and forth within the rail grooves 25 of the fixed rail plate 21. A cam follower protrusion 31 is provided on the upper surface of each of the coil guide members 30, and the coil guide members 30 form a guide passage 33 connected to the slots 5 of the stator core 3 in an up and down, or vertical, direction. Such coil guide members 30 may guide the stator coils 7 transferred by the multi-axis robot 9 to the slots 5 of the stator core 3 in the up and down direction through the guide passage 33. FIG. 6 is a perspective view illustrating coil guide members applied to an apparatus for guiding insertion of a segment type stator coil according to an exemplary embodiment, and FIG. 7 and FIG. 8 respectively illustrate a guide finger portion of coil guide members applied to an apparatus for guiding insertion of a segment type stator coil according to an exemplary embodiment. Referring to FIG. 4 to FIG. 8, each of the coil guide members 30 according to an exemplary embodiment includes a guide arm 41 and a guide finger 42. The guide arms 41 are radially coupled to the rail grooves 25 of the fixed rail plate 21, slidably in the back and forth, or forward and rearward, direction. The cam follower protrusions 31 mentioned above are provided on the upper surfaces of the guide arms 41. The guide finger 42 is integrally formed at an end of the guide arm 41 toward the center of the penetration hole 23 of the fixed rail plate 21, and such guide fingers 42 form the guide passages 33. Here, an upper surface of the guide finger 42 is formed to gradually narrow radially inward from the end of the guide arm 41. In addition, the guide finger 42 is provided with a length longer than the length of the slot 5 for smooth guide of the stator coils 7. The guide passage 33 is formed by neighboring guide fingers 42, and is connected to the slot 5 in the up and down direction. That is, the coil guide members 30 form the slots 5 of the stator core 3 and the guide passage 33 connected to the up and down directions between each other neighboring the guide finger 42. That is, the coil guide members 30 form, between the neighboring guide fingers 42, the guide passages 33 connected to the slots 5 of the stator core 3 in the up and down direction. In addition, the guide finger 42 is provided in a form in which a cross-section width gradually increases from the top to the bottom, for prevention of erroneous insertion and for smoother guide of the stator coil 7 into the slot 5. That is, the guide finger 42 forms a tapered surface 45 at each of the lateral sides. Therefore, two neighboring guide fingers 42 may form the guide passage 33 connected to the slots 5 in the up and down direction, between the tapered surfaces 45 of the neighboring guide fingers 42. Referring to FIG. 2, in an exemplary embodiment, the driving unit 50 is for applying back and forth operational force to the coil guide members 30, and is installed to be connected to the coil guide members 30. The driving unit 50 includes a movable rail plate 51 and a servo-motor 61. FIG. 9 illustrates a movable rail plate portion applied to an apparatus for guiding insertion of a segment type stator coil according to an exemplary embodiment. Referring to FIG. 2 and FIG. 9, the movable rail plate 51 according to an exemplary embodiment is disposed on the fixed rail plate 21, and is provided in a disk shape corresponding to the fixed rail plate 21. The movable rail plate 51 is installed to be rotatably by the servo-motor 61, while contacting the upper surface of the fixed rail plate 21 through a lower surface of the movable rail plate 51. The movable rail plate 51 may be rotatably supported by the fixed rail plate 21 or an additional supporting device. A lower surface of the movable rail plate 51 is formed with cam follower rails 53 in contact with the cam follower protrusions 31 of the coil guide members 30. The cam follower rails 53 are provided in a number corresponding to the coil guide members 30, and are formed as a cam groove in which the cam follower protrusion 31 of the coil guide members 30 is fitted. The cam follower rails 53 are formed on the lower surface of the movable rail plate 51 in an oblique direction. In addition, gear teeth 55 are formed at an edge of the movable rail plate 51. Referring to FIG. 2 and FIG. 9, the servo-motor 61 is installed on the frame 10, as a motor capable of servo control of rotation speed and rotating direction. The servo-motor 61 is provided with a drive gear 63 that is gear-meshed with the gear teeth 55 of the movable rail plate 51. In an exemplary embodiment, as shown in FIG. 2, the core supply unit 70 is to correctly position the stator core 3 transferred by a conveyor or a robot at an interior side of the penetration hole 23 of the fixed rail plate 21 from below the upper surface of the frame 10 through the connection hole 11 of the frame 10. The core supply unit 70 is installed to be movable in the up and down direction, and loads the stator core 3 from below the upper surface of the frame 10. The core supply unit 70 includes a core loading portion 71 and an operation cylinder 73. The core loading portion 71 is provided in a base portion 75 below the upper surface of the frame 10, to be movable in the up and down directions. Furthermore, the core loading portion 71 may be rotated by a motor to a rotation angle corresponding to the slots 5 of the stator core 3. The operation cylinder 73 is installed in the base portion 75 and connected to the core loading portion 71. The operation cylinder 73 is connected to the core loading portion 71 through an operation rod, and may reciprocally move the core loading portion 71 in the up and down directions by the back and forth operation of the operation rod. Hereinafter, an operation of an apparatus 100 for guiding insertion of a segment type stator coil according to an exemplary embodiment is described in detail reference to drawings. FIG. 10 and FIG. 11 respectively illustrate an operation of an apparatus for guiding insertion of a segment type stator coil according to an exemplary embodiment. Referring to FIG. 10 and the above-mentioned drawings, in an exemplary embodiment, the coil guide members 30 are in a state of being moved backwards along the rail grooves 25 of the fixed rail plate 21 by the rotation of the movable rail plate 51. That is, the guide fingers 42 of the coil guide members 30 are positioned outside the penetration hole 23 of the fixed rail plate 21. Here, the cam follower protrusions 31 of the coil guide members 30 are supported by the cam follower rails 53 of the movable rail plate 51. At this time, in an exemplary embodiment, while the stator core 3 is loaded on the core loading portion 71 of the core supply unit 70 by a conveyor or robot, the core loading portion 71 is moved upward by the operation of the operation cylinder 73. Therefore, in an exemplary embodiment, the stator core 3 may be correctly positioned on the inner periphery of the penetration hole 23 of the fixed rail plate 21 through the connection hole 11 of the frame 10. In such a state, in an exemplary embodiment, referring to FIG. 11 and other drawings, the drive gear 63 is rotated by driving the servo-motor 61, and the movable rail plate 51 is rotated by the drive gear 63. Then, in an exemplary embodiment, the rotation movement of the movable rail plate 51 is converted into a linear movement of the coil guide members 30 by a cam operation of the cam follower protrusion 31 and the cam follower rail 53. Therefore, in an exemplary embodiment, the coil guide members 30 are moved forward in the radial direction along the rail grooves 25 of the fixed rail plate 21, and accordingly, the guide fingers 42 of the coil guide members 30 also move toward the interior side of the penetration hole 23 of the fixed rail plate 21. At this time, the guide fingers 42 of the guide members 30 are positioned above the slots 5 of the stator core 3, and are longer than the slot 5. As the guide fingers 42 of the coil guide members 30 are positioned interior to the penetration hole 23 of the fixed rail plate 21, in an exemplary embodiment, the guide passages 33 connected to the slots 5 of the stator core 3 in the up and down direction are formed between the neighboring guide fingers 42. That is, in an exemplary embodiment, the guide passages 33 connected to the slots 5 in the up and down direction may be formed between the tapered surfaces 45 of the neighboring guide fingers 42. Then, in an exemplary embodiment, the stator coil 7 is gripped by the multi-axis robot 9, and the stator coil 7 is moved along the predetermined path by the multi-axis robot 9 and then inserted into the slots 5 of the stator core 3 through the guide passages 33 of the coil guide members 30. In this process, the stator coil 7 is moved downward from the top by the multi-axis robot 9, and when inserted into the slot 5 of the stator core 3, the stator coil 7 is guided into the slot 5 by the tapered surfaces 45 of the guide passage 33. In an exemplary embodiment, the stator coils 7 may be inserted into the slots 5 in multiple layers by controlling a path variable of the multi-axis robot 9 while the position of the stator core 3 is fixed. As an alternative, in an exemplary embodiment, the core loading portion 71 loaded with the stator core 3 is rotated by a rotation angle corresponding to the slots 5, and the stator coils 7 may be inserted into the slots 5 as multiple layers along the predetermined path of the multi-axis robot 9. According to an apparatus 100 for guiding insertion of a segment type stator coil according to an exemplary embodiment, as the stator coil 7 is guided to the slot 5 by the coil guide members 30, the stator coils 7 may be directly inserted into the slots 5 by the multi-axis robot 9. Therefore, in an exemplary embodiment, an additional apparatus and process for aligning stator coils 7 may be removed, and an additional gripping apparatus and process for gripping the stator coils 7 aligned in the aligning apparatus and inserting the gripped stator coils 7 into the slots 5 of the stator core 3 may be removed. Accordingly, in an exemplary embodiment, equipment investment cost may be reduced, the cycle time for assembling the stator may be shortened, and the winding quality of the stator coils 7 may be further improved. While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An apparatus for guiding insertion of segment type stator coils into slots of a stator core, the stator coils being in multiple layers in a radial direction, the apparatus comprising:
   a fixed rail plate provided in a disk shape forming a penetration hole at a central portion, fixedly installed on an upper surface of a frame, and forming a plurality of rail grooves radially on an upper surface of the fixed rail plate;
   a plurality of coil guide members comprising upper surfaces and having cam follower protrusions on the upper surfaces, installed to move back and forth in the rail grooves of the fixed rail plate, and forming guide passages connected to the slots in an up and down direction;
   a movable rail plate rotatably installed and having a lower surface contacting the upper surface of the fixed rail plate, the lower surface of the movable rail plate being formed with cam follower rails in contact with the cam follower protrusions of the coil guide members; and
   a servo-motor installed in the frame and having a drive gear gear-meshed with the movable rail plate; and
   a core supply unit installed to be movable in the up and down direction and configured to load the stator core from below the upper surface of the frame and to position the stator core to an interior side of the penetration hole of the fixed rail plate through the upper surface of the frame.

2. The apparatus of claim 1, wherein the rail grooves are formed on the upper surface of the fixed rail plate, linearly toward a center of the penetration hole of the fixed rail plate.

3. The apparatus of claim 1, wherein:
   the movable rail plate is formed in a disk shape corresponding to the fixed rail plate; and
   the cam follower rails are formed on the lower surface of the movable rail plate in an oblique direction.

4. The apparatus of claim 1, wherein gear teeth gear-meshed with the drive gear are formed on an edge of the movable rail plate.

5. The apparatus of claim 1, wherein each of the coil guide members comprises:
- a guide arm coupled to the rail groove of the fixed rail plate, slidably in the back and forth direction; and
- a guide finger integrally formed at an end the guide arm toward a center of the penetration hole of the fixed rail plate.

6. The apparatus of claim 5, wherein the guide fingers of the coil guide members form the guide passages connected to the slots in the up and down direction between neighboring guide fingers.

7. The apparatus of claim 5, wherein the guide finger is provided in a form in which a cross-section width gradually increases from a top to a bottom, and forms a tapered surface at each of lateral sides.

8. The apparatus of claim 7, wherein the guide passages connected to the slots in the up and down direction are formed between tapered surfaces of neighboring guide fingers.

9. The apparatus of claim 5, wherein the guide finger is formed longer than the slot.

\* \* \* \* \*